United States Patent
Ahmed (10) Patent No.: US 12,220,845 B1
(45) Date of Patent: Feb. 11, 2025

(54) USING PALM WASTE TO MANUFACTURE PANELS MIXED WITH POLYMER MATERIALS

(71) Applicant: KING SAUD UNIVERSITY, Riyadh (SA)

(72) Inventor: Yasser Fouad Ahmed, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/608,159

(22) Filed: Mar. 18, 2024

(51) Int. Cl.
| | |
|---|---|
| *B29C 39/12* | (2006.01) |
| *B29C 39/00* | (2006.01) |
| *B29C 39/24* | (2006.01) |
| *B29K 1/00* | (2006.01) |
| *B29K 63/00* | (2006.01) |
| *B29K 67/00* | (2006.01) |
| *B29K 75/00* | (2006.01) |
| *B29K 105/00* | (2006.01) |

(52) U.S. Cl.
CPC .......... *B29C 39/123* (2013.01); *B29C 39/003* (2013.01); *B29C 39/24* (2013.01); *B29K 2001/00* (2013.01); *B29K 2063/00* (2013.01); *B29K 2067/00* (2013.01); *B29K 2075/00* (2013.01); *B29K 2105/0005* (2013.01)

(58) Field of Classification Search
CPC ..... B29C 39/123; B29C 39/003; B29C 39/24; B29K 2001/00; B29K 2063/00; B29K 2067/00; B29K 2075/00; B29K 2105/0005
USPC .......................................................... 524/35
See application file for complete search history.

(56) References Cited

U.S. PATENT DOCUMENTS 3,615,979 A * 10/1971 Davis, Sr. ............. B29C 70/542
156/87

FOREIGN PATENT DOCUMENTS

| IN | 403221 B | | 11/2019 |
| JP | H11254568 A | * | 9/1999 |
| WO | 2017093865 A1 | | 6/2017 |

OTHER PUBLICATIONS

Gherissi, A., et al., "Wind Turbine Blades Structure Based on Palm Cellulose Fibers Composite Material" Journal of Silicate Based and Composite Materials, 73(3): pp. 109-114 (2021).
Ali, Malek, "Epoxy-Date Palm Fiber Composites: Study on Manufacturing and Properties" International Journal of Polymer Science, 2023:5670293 (Jan. 2023).
Birniwa, A. H., et al., "Recent Trends in Treatment and Fabrication of Plant-Based Fiber-Reinforced Epoxy Composite: A Review" Journal of Composites Science, 7:120 (Mar. 2023).
Samad, A. R., et al., "A Study On Different Compositions of Epoxy Resin Reinforced With Natural Fibers and Glass Fiber" International Journal of Engineering Research & Technology, 9(9): pp. 288-290 (2020).

* cited by examiner

*Primary Examiner* — Ling Siu Cho
*Assistant Examiner* — Ronald Grinsted
(74) *Attorney, Agent, or Firm* — Nath, Goldberg & Meyer; Joshua B. Goldberg (57) ABSTRACT

A method of making a panel using palm fiber, the method comprising: mixing a resin and a hardener to form a mixture; pouring a first portion of the mixture into a mold to provide a first resin layer; adding a first amount of palm fiber on top of the first resin layer to form a first fiber layer; compacting the first fiber layer; pouring a second portion of the mixture into the mold to form a second resin layer on top of the first fiber layer; adding a second amount of palm fiber on top of the second resin layer to form a second fiber layer; compacting the second fiber layer; and obtaining the panel.

17 Claims, 7 Drawing Sheets

USING PALM WASTE TO MANUFACTURE PANELS MIXED WITH POLYMER MATERIALS

BACKGROUND

Field

The disclosure of the present patent application relates to a method of making polymer panels using palm waste.

Description of the Related Art

Palm tree fronds can be a large source of non-recyclable waste. The coarse leaves of palm trees can take years to break down, making the plant difficult to compost. Palm fronds can take up to 50 years to decompose on their own.

The fibrous nature of palm fronds slows the biodegrading process significantly. The fronds turn into small, wiry strands as they break down. Green-waste facilities often refuse palm fronds because the strands can get tangled in shredding equipment, causing damage to machinery and halting recycling production for repairs.

Minimizing palm-frond waste is part of many cities' sustainability initiatives, which aim to turn trash into usable resources.

Utilizing various natural palm fibers for wind turbine blades is already emerging as an alternate energy production method. Installing small wind turbines in breezy locations will become increasingly sustainable as the cost of electricity rises and small wind turbines' costs fall as a result of technological advancements and mass production. Such wind turbine blades are typically made of materials such as carbon fiber, Kevlar, or glass fiber, none of which are renewable. As wind turbines and their blades reach the end of their useful lives, humanity will face a massive amount of garbage that cannot be recycled.

Thus, a new solution for recycling parts of the palm tree is desired.

SUMMARY

The present subject matter relates to a method of forming panels from palm fibers. In certain embodiments, the thus produced panels can be used as wind turbine blades.

Accordingly, panels, such as panels useful for forming wind turbines, can be made using palm fibers, which are free to use in Saudi Arabia and have good mechanical qualities, as described herein. Such wind turbine blades can be used anywhere having a sizable and consistent high wind speed, including, by way of non-limiting example, in the Neom region, which has the potential to supply high input power to wind turbines. Accordingly, the present subject matter is directed to a promising candidate to produce completely recycled and/or recyclable wind turbine blades from natural fibers, namely natural palm fibers based on cellulosic fibers.

Accordingly, in an embodiment, the present subject matter relates to a method of making a panel using palm fiber, the method comprising: mixing a resin and a hardener to form a mixture; pouring a first portion of the mixture into a mold to provide a first resin layer; adding a first amount of palm fiber on top of the first resin layer to form a first fiber layer; compacting the first fiber layer; pouring a second portion of the mixture into the mold to form a second resin layer on top of the first fiber layer; adding a second amount of palm fiber on top of the second resin layer to form a second fiber layer; compacting the second fiber layer; and obtaining the panel.

These and other features of the present subject matter will become readily apparent upon further review of the following specification.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not. For example, "optionally substituted alkyl" means either "alkyl" or "substituted alkyl," as defined herein.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

As described herein, panels, such as panels useful for forming wind turbines, can be made using palm fibers, which are free to use in Saudi Arabia and have good mechanical qualities, as described herein. Such wind turbine blades can be used anywhere having a sizable and consistent high wind speed, including, by way of non-limiting example, in the Neom region, which has the potential to supply high input power to wind turbines. Accordingly, the present subject matter is directed to a promising candidate to produce completely recycled and/or recyclable wind turbine blades from natural fibers, namely natural palm fibers based on cellulosic fibers.

Accordingly, in an embodiment, the present subject matter relates to a method of making a panel using palm fiber, the method comprising: mixing a resin and a hardener to form a mixture; pouring a first portion of the mixture into a mold to provide a first resin layer; adding a first amount of palm fiber on top of the first resin layer to form a first fiber layer; compacting the first fiber layer; pouring a second portion of the mixture into the mold to form a second resin layer on top of the first fiber layer; adding a second amount of palm fiber on top of the second resin layer to form a second fiber layer; compacting the second fiber layer; and obtaining the panel. In one embodiment, the palm fiber used herein can be obtained from a palm part selected from the group consisting of palm leaves, palm leaf sticks, palm leaf pieces, and a combination thereof. In this regard, the palm leaf sticks represent long fibers while the palm leaf pieces represent short fibers.

In another embodiment, the present subject matter relates to panels made according to the methods described herein.

In one embodiment in this regard, the palm part can be palm leaves. According to this embodiment, the panels produced using palm leave can withstand an impact up to about 3.2 J, or about 3.2 J.

In another embodiment, the palm part can be palm leaf sticks. According to this embodiment, the panels produced using palm leaf sticks can withstand an impact up to about 4.1 J, or about 4.1 J.

In one embodiment in this regard, the palm part can be palm leaf pieces.

According to this embodiment, the panels produced using palm leaf pieces can withstand an impact up to about 2.3 J, or about 2.3 J.

Accordingly, the panels produced herein can withstand an impact from about 2.3 J to about 4.1 J.

In another embodiment of the present subject matter, the resin and the hardener may be mixed in a 2:1 ratio, by wt %, to form the mixture. In various embodiments, the first portion of the mixture may be about half the mixture. The second portion of the mixture may include about half the mixture prepared.

In a further embodiment, the resin may be selected from the group consisting of polyester resin, polyurethane resin and epoxy resin.

In an embodiment, each of the first fiber layer and the second fiber layer may be compacted with a roller.

In various embodiments, compacting the first fiber layer and the second fiber layer may use a force of about 100 psi to about 3000 psi for each layer.

In another embodiment, the panel may be cut into a shape. The shape may take the shape of a blade or a wind turbine blade. Cutting of the blade may be done by a milling machine.

In various embodiments, the first amount of palm fiber may be about 50 g to about 500 g.

In other embodiments, the second amount of palm fiber may be about 50 g to about 500 g.

The following examples illustrate the present teachings.

Example 1

Making Samples

Figure 1:
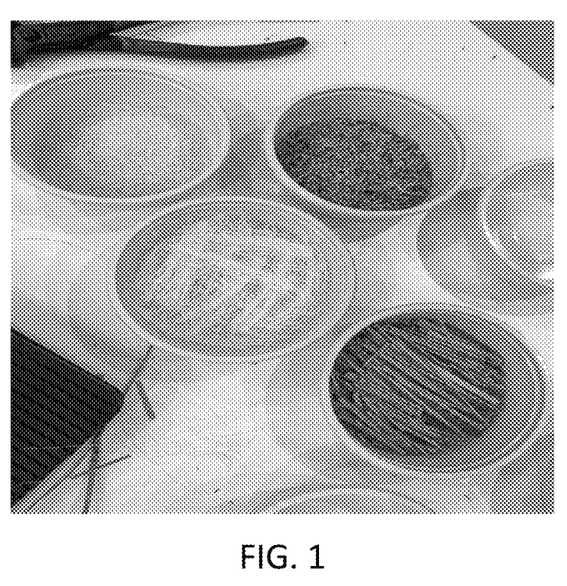
FIG. 1 is a photo of samples of different fibers used herein.
Figure 2:
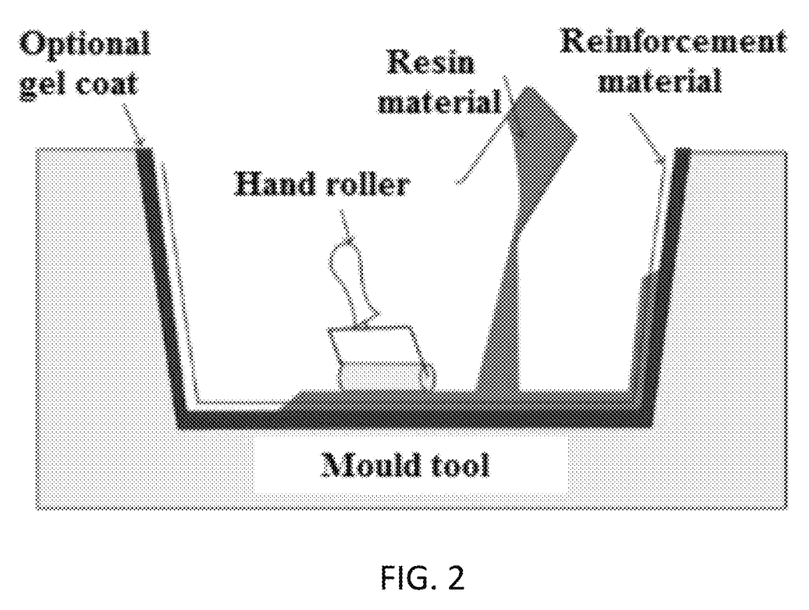
FIG. 2 is a representation of the method of forming panels using a resin mold as described herein.

Multiple samples were made in order to be used for testing. Samples were made from various types of fibers to determine which fiber offers the best strength. The fiber types included 1—pure resin; 2—palm leaf; 3—palm leaf sticks (long fiber); 4—palm lead pieces (short fiber), as illustrated in FIG. 1. The resin and hardener were added in a 2:1 ratio, by wt %. Then a first layer of resin was poured into the mold and a layer of fiber of weighted fiber was added to the mixture of resin and hardener to form a first layer. The fiber was weighted to determine what percentage of fiber was used. One the fiber was added a roller was used to compact the first layer. Then a second layer was added using the same procedure including pouring the mixture into the mold to form the second layer on top of the first layer, adding a second layer on top of the first layer; and compacting the second layer. This method was repeated several times to create a panel as illustrated in FIG. 2. The finished samples are illustrated in FIG. 3.

Example 2

Cutting Samples for Testing

Figure 3:
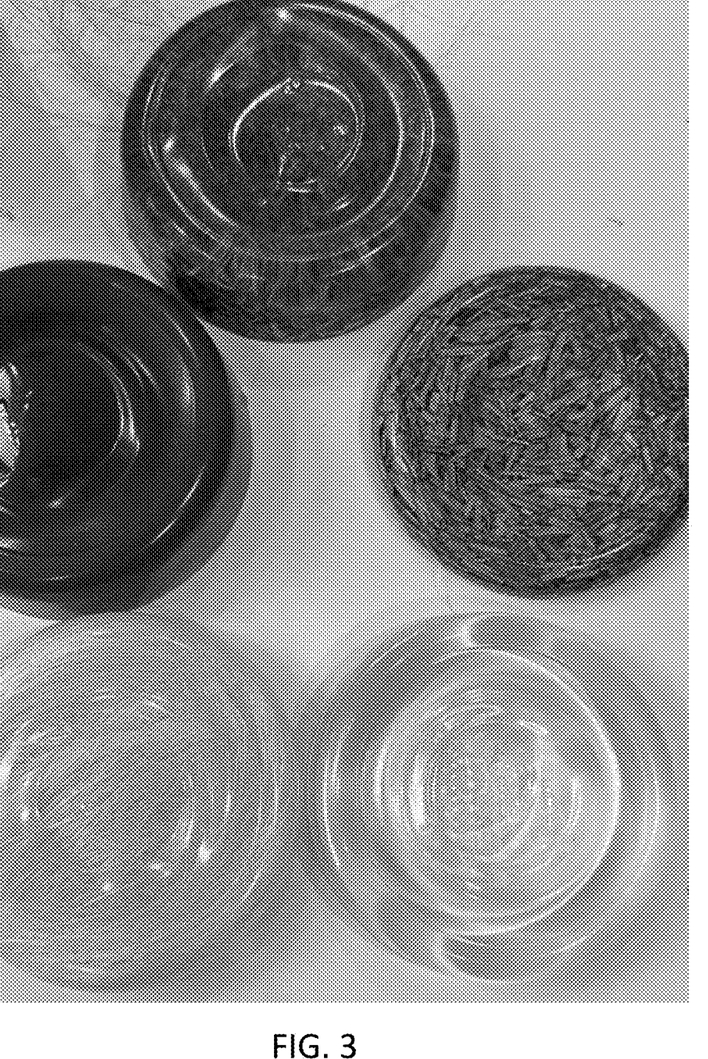
FIG. 3 is a photo of samples made according to the method as described herein.
Figure 4A:
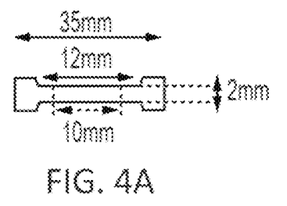
FIGS. 4A, 4B, 4C, and 4D are embodiments of the dimensions used in the tensile testing of panels made according to the method as described herein.
Figure 4B:
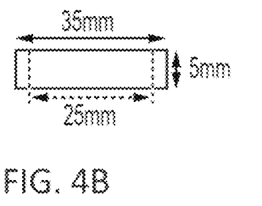
Figure 4C:
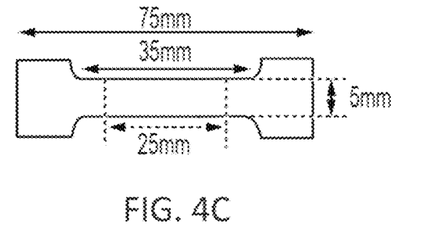
Figure 4D:
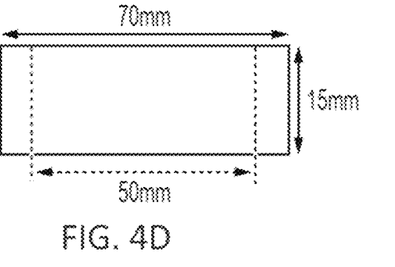
Figure 5:
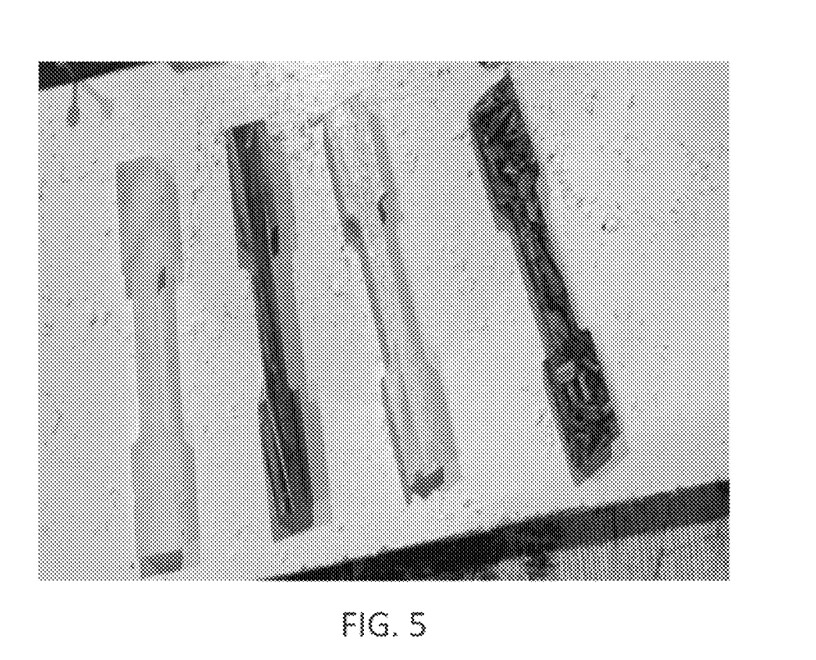
FIG. 5 is a photograph of samples of specimens made according to the method as described herein and used in tensile testing.

The samples formed in Example 1 and illustrated in FIG. 3 were cut to be used for testing. The specimens were cut into desired dimensions using a milling machine. A sample having the dimensions of 35 mm by 5 mm by 25 mm as illustrated in FIG. 4B was cut into samples having the dimensions of 35 mm by 2 mm as illustrated in FIG. 2A. A sample having the dimensions 70 mm by 15 mm, as illustrated in FIG. 4D, were cut into samples having the dimensions 75 mm by 5 mmm as illustrated in FIG. 4C. Examples of the cut specimens are illustrated in FIG. 5.

Example 3

Tensile Testing

Tensile testing is a fundamental type of mechanical testing performed by engineers and materials scientists in manufacturing and research facilities all over the world. A tensile test (or tension test) applies force to a material specimen to measure the material's response to tensile (or pulling) stress. This type of testing provides insight into the mechanical properties of a material and enables product designers to make informed decisions about when, where, and how to use a given material.

Tensile testing and material characterization are crucial for manufacturers and researchers in all industries. In order for a material to be selected for a new product or use, researchers must ensure that it can withstand the mechanical forces that it will encounter in its end-use application. For example, tire rubber must be elastic enough to absorb inconsistencies in road surfaces. materials and products might be exposed to mechanical forces for short or long periods of time, through cyclical or repeated use, and in a wide variety of different temperature and environmental conditions. In addition, tensile testing is also used by quality assurance departments to ensure that batches of finished product are meeting the required specifications for tensile properties. This is important from both a safety and a business perspective, as defective products can be dangerous to the end user and can also cause significant harm to manufacturers in the form of product delays, lost revenue, and damaged reputations. Tensile tests are performed on universal testing machines, also known as tensile machines or tensile testing machines. These machines consist of a single or dual column frame equipped with a load cell, testing software, and application-specific grips and accessories such as extensometers. Universal testing machines come in a wide variety of force capacities and can be configured with different fixtures to test any product, component, or material.

Figure 6:
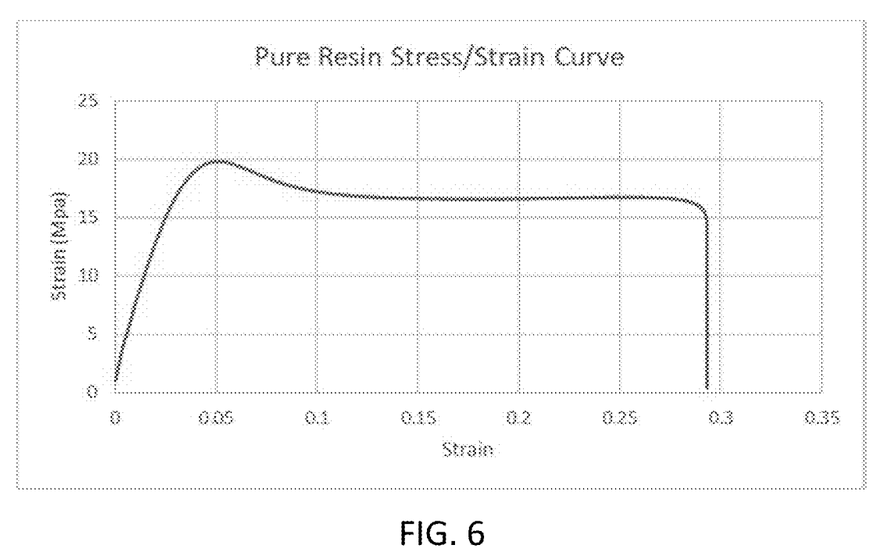
FIG. 6 is a graph of a strain curve for a sample including pure resin used in tensile testing.
Figure 7:
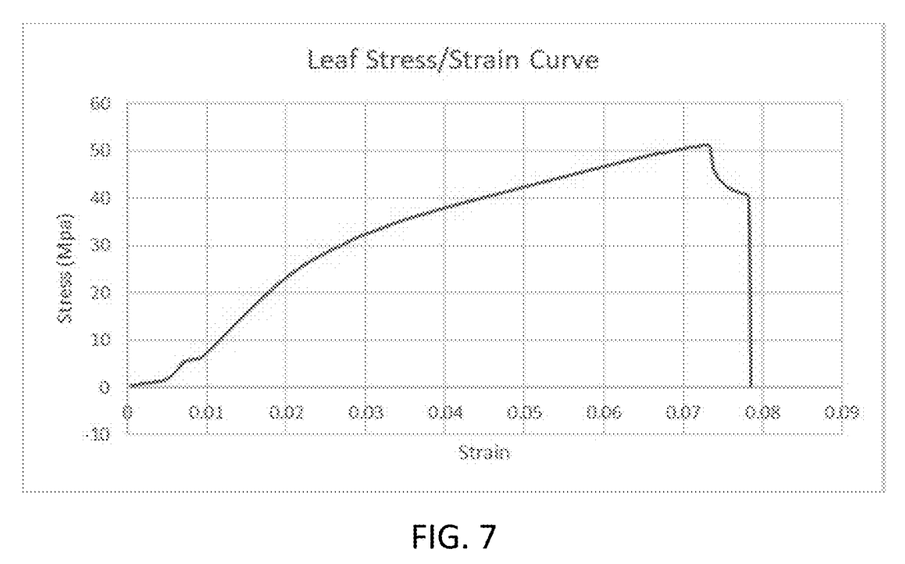
FIG. 7 is a graph of a strain curve for a sample including palm leaf fiber used in tensile testing.
Figure 8:
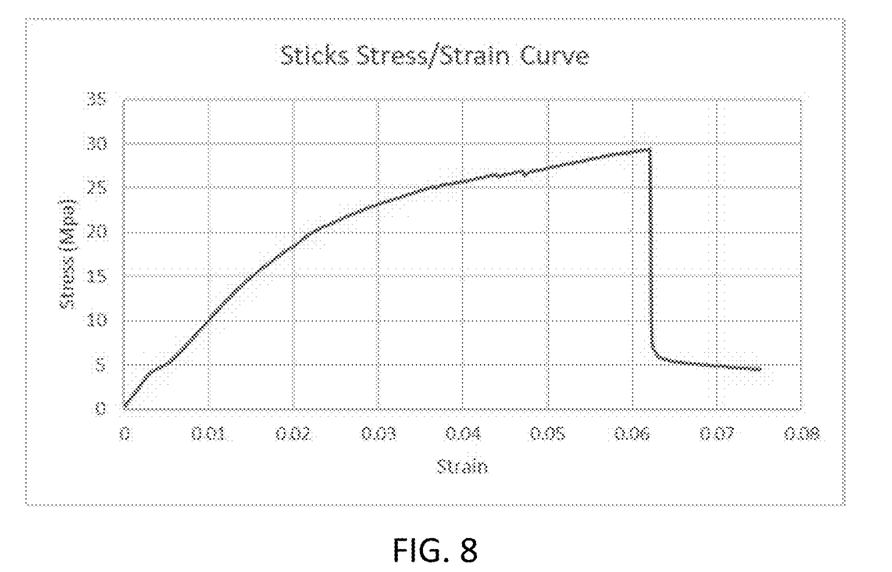
FIG. 8 is a graph of a strain curve for a sample including sticks of palm leaf used in tensile testing.
Figure 9:
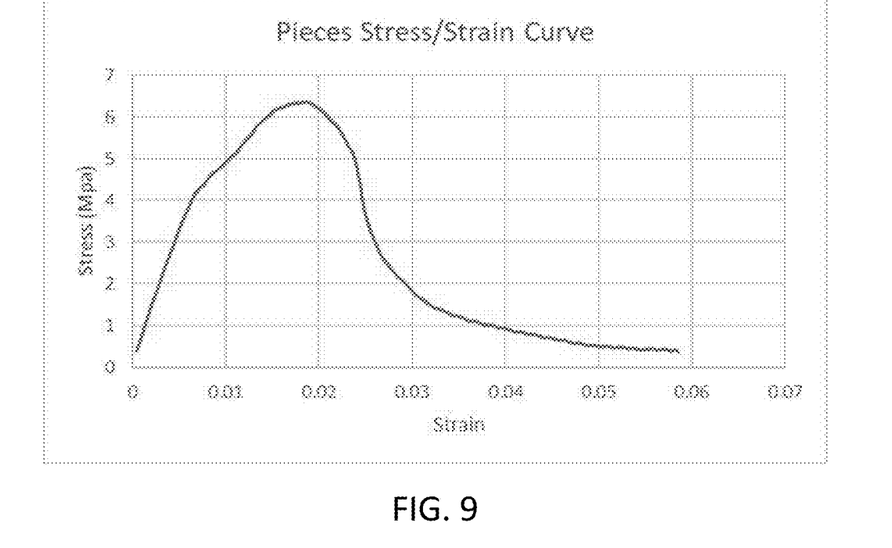
FIG. 9 is a graph of a strain curve for a sample including pieces of palm leaf used in tensile testing.

The results of the tensile testing are illustrated in FIGS. 6, 7, 8, and 9. FIG. 6 shows the tensile strength of the resin and hardener with no palm fiber. FIG. 7 illustrates the tensile strength of samples including palm leaf with the resin and hardener. FIG. 8 illustrates the tensile strength of samples including palm sticks with the resin and hardener. FIG. 9 illustrates the tensile strength of samples including palm pieces with the resin and hardener. The most major factor from the curves when comparing the pure resin with the reinforced samples, is that the ductility drops significantly in all fibers. The leaf fiber sample makes the sample a lot stronger. This sample can take more than double the stress of the pure resin, but that strength comes at the cost of ductility.

Example 3

Charpy Impact Testing

Figure 10:
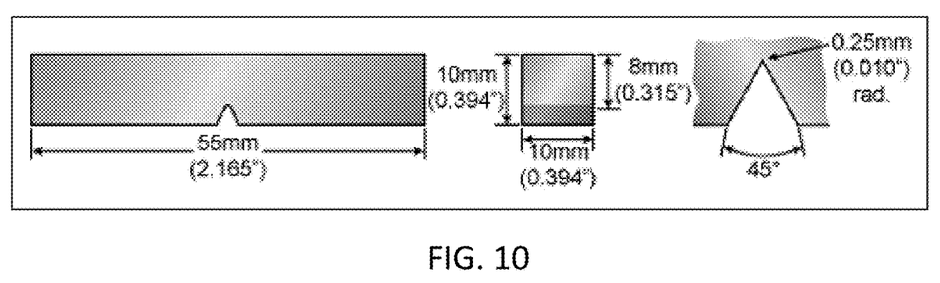
FIG. 10 is a diagram of specimen dimensions for a Charpy impact test for embodiments of panels made according to the method described herein.
Figure 12:
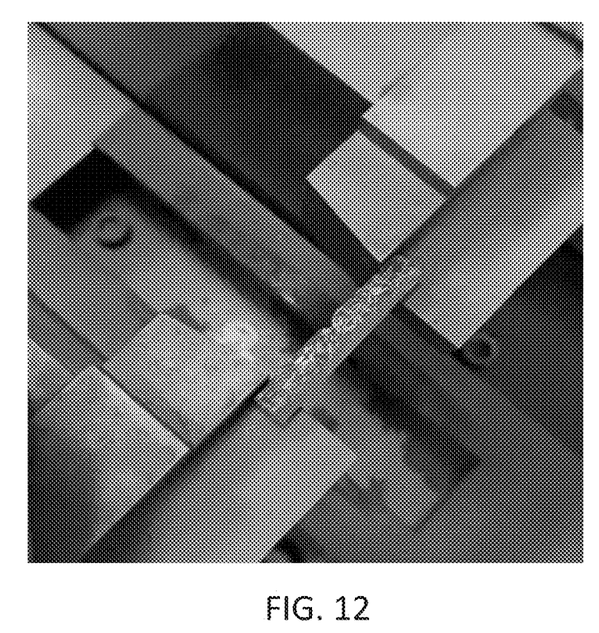
FIG. 12 is a photograph of a specimen placed in an impact tester machine for embodiments of panels made according to the method described herein.

The Charpy impact test, also known as the Charpy V-notch test, is a high strain-rate test that involves striking a standard notched specimen with a controlled weight pendulum swung from a set height. The impact test helps measure the amount of energy absorbed by the specimen during fracture. The standard Charpy-V notch specimen is 55 mm long, 10 mm square and has a 2 mm deep notch with a tip radius of 0.25 mm machined on one face as illustrated in FIG. 10. In some circumstances, sub-size Charpy specimens can be tested with thickness less than 10 mm. The specimen is supported at its two ends on an anvil, as illustrated in FIG. 12, and struck on the opposite face to the notch by the pendulum.

Figure 11:
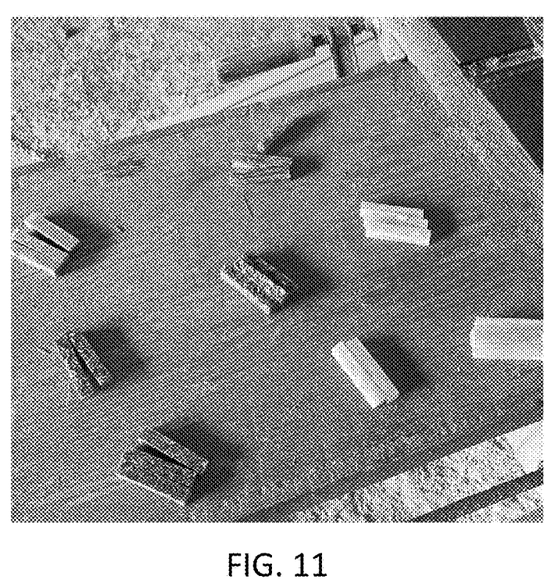
FIG. 11 is a photograph of specimens used in a Charpy impact test for embodiments of panels made according to the method described herein.

Examples of the specimens used are illustrated in FIG. 11. The amount of energy absorbed in fracturing the test-piece is measured and this gives an indication of the notch toughness of the test material. The pendulum swings through during the test, the height of the swing being a measure of the amount of energy absorbed in fracturing the specimen. Conventionally, three specimens are tested at any one temperature and the results averaged. Alternatively, tests are carried out at a range of temperatures to generate a ductile to brittle transition curve. Charpy tests show whether a metal can be classified as being either brittle or ductile. This is particularly useful for ferritic steels that show a ductile to brittle transition with decreasing temperature. A brittle metal will absorb a small amount of energy when impact tested, a tough ductile metal absorbs a large amount of energy. The appearance of a fracture surface also gives information about the type of fracture that has occurred; a brittle fracture is bright and crystalline; a ductile fracture is dull and fibrous.

The percentage crystallinity is determined by making a judgement of the amount of crystalline or brittle fracture on the surface of the broken specimen and is a measure of the amount of brittle fracture. Lateral expansion is a measure of the ductility of the specimen. When a ductile metal is broken, the test-piece deforms before breaking, and material is squeezed out on the sides of the compression face. The amount by which the specimen deforms in this way is measured and expressed as millimeters of lateral expansion. When reporting the results of a Charpy test, the absorbed energy (in J) is always reported, while the percentage crystallinity and lateral expansion are optional on the test report. It should be emphasized that Charpy tests are qualitative, the results can only be compared with each other or with a requirement in a specification—they cannot be used to calculate the fracture toughness of a weld or parent metal.

Figure 13:
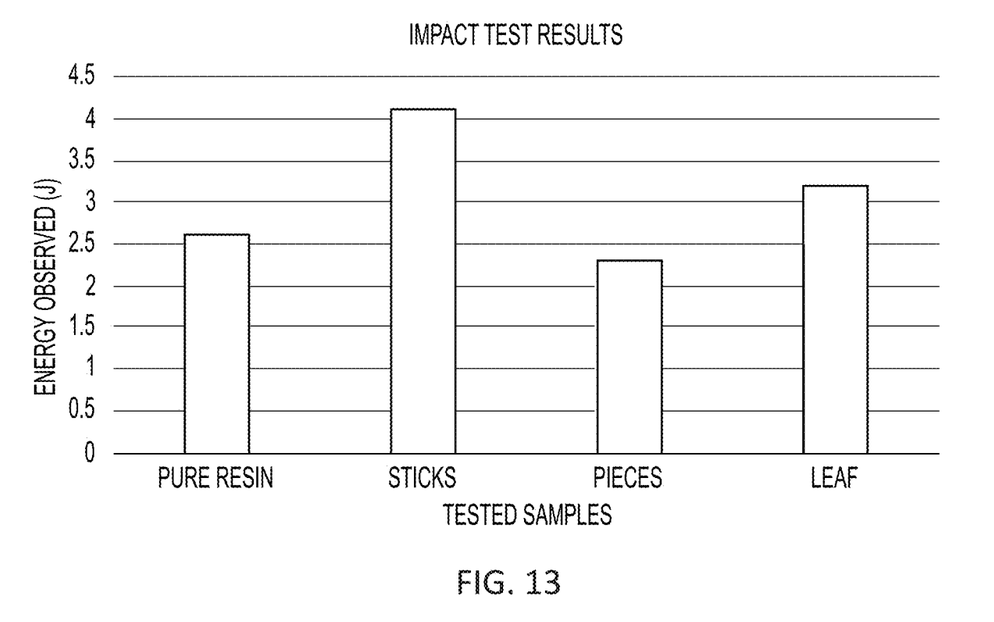
FIG. 13 is a graph of average impact results of samples made according to the method described herein.

As illustrated in the graph in FIG. 13, panels with stick palm fibers provide the toughest panels with 4.1 J of energy.

The method of forming the panels as described herein is considered promising because it gives a solid material which is recyclable.

It is to be understood that the method of forming panels from palm fibers described herein is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A method of making a panel using palm fiber, the method comprising:
    mixing a resin and a hardener to form a mixture;
    pouring a first portion of the mixture into a mold to provide a first resin layer;
    adding a first amount of palm fiber on top of the first resin layer to form a first fiber layer;
    compacting the first fiber layer;
    pouring a second portion of the mixture into the mold to form a second resin layer on top of the first fiber layer;
    adding a second amount of palm fiber to the second resin layer to form a second fiber layer;
    compacting the second fiber layer; and
    obtaining the panel.

2. The method of claim 1, wherein the resin and the hardener are mixed in a 2:1 ratio, by wt %, to form the mixture.

3. The method of claim 1, wherein the resin is selected from the group consisting of polyester resin, polyurethane resin and epoxy resin.

4. The method of claim 1, wherein the palm fiber is selected from the group consisting of palm leaves, palm leaf sticks, palm leaf pieces, and a combination thereof.

5. The method of claim 1, wherein the first fiber layer is compacted with a roller.

6. The method of claim 1, wherein compacting the first fiber layer uses a force about 100 psi to about 3000 psi.

7. The method of claim 1, wherein the second fiber layer is compacted with a roller.

8. The method of claim 1, wherein compacting the second fiber layer uses a force about 100 psi to about 3000 psi.

9. The method of claim 1, further comprising cutting the panel into a shape.

10. The method of claim 9, wherein the shape is a blade.

11. The method of claim 9, wherein the cutting comprises using a milling machine.

12. The method of claim 1, wherein the first portion of the mixture and the first amount of palm fiber are added in a 2:1 ratio, by wt %.

13. The method of claim 1, wherein the second portion of the mixture and the second amount of palm fiber are added in a 2:1 ratio, by wt %.

14. The method of claim 1, wherein the first amount of palm fiber is about 50 g to about 500 g.

15. The method of claim 1, wherein the second amount of palm fiber is about 50 g to about 500 g.

16. A panel made according to the method of claim 1.

17. The panel of claim 16, wherein the panel can withstand an impact from about 2.3 J to about 4.1 J.

* * * * *